July 22, 1952 P. BORCHARDT 2,603,956
PROCESS OF AND APPARATUS FOR THE PURIFICATION OF AIR
Filed May 2, 1950
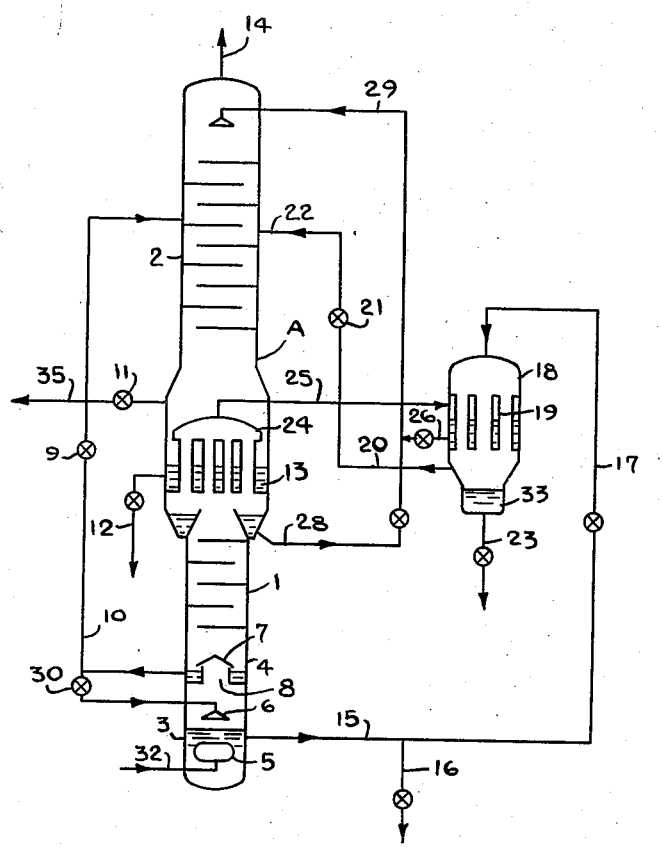
INVENTOR.
PHILIPP BORCHARDT
BY
ATTORNEY Patented July 22, 1952

2,603,956

UNITED STATES PATENT OFFICE 2,603,956

PROCESS OF AND APPARATUS FOR THE PURIFICATION OF AIR

Philipp Borchardt, Munich-Solln, Germany, assignor to Gesellschaft fuer Linde's Eismachinen A.-G., Hoellriegelskreuth, near Munich, Germany Application May 2, 1950, Serial No. 159,549
In Germany May 5, 1949

8 Claims. (Cl. 62—122)

This invention relates to a process and an apparatus for the purification of air.

It is known to separate air into its component gases by a two-stage rectification. Thus, before the air is passed from a cold exchanger to a rectification apparatus it is first passed through a separator in order to remove readily condensable vapors or gases such as carbon dioxide. To this end the air is passed in the separator through a washing liquid which essentially consists of liquid oxygen. This washing liquid is then freed by a filter from solid condensates. Finally the cleaned washing liquid is then passed into a low-pressure column for further separation of the air by rectification.

This known separation process, however, has the disadvantage that in the washing liquid traces of oil and acetylene will accumulate which may pass with the washing liquid into the rectification apparatus and may endanger its proper operation.

It is accordingly an object of the invention to provide a novel process of and apparatus for purifying air by means of a low-temperature cooling and rectification which avoids the drawbacks of the prior art.

A further object of the invention is to provide a process for separating air into oxygen and nitrogen, which will increase the safety of the operation.

In accordance with the present invention a small fraction of an oxygen-rich liquid obtained from the pressure column of the rectification apparatus is utilized to pre-wash the air and to remove impurities therefrom by passing it through the liquid or sprinkling the air with the liquid. This washing liquid is contaminated by the impurities contained in the air. The contaminated liquid is either removed from the system or, alternatively, it is removed after extensive evaporation. The major fraction of the oxygen-rich liquid formed in the pressure column and which is free from impurities, is directly passed into the low-pressure column of the rectification apparatus for further separation.

Thus the essential difference between the invention and known processes resides in the separation of the liquid obtained from the pressure column into a small fraction which serves to wash the air entering the rectification apparatus and which is discharged, if desired after evaporation, and into a major fraction which is free from impurities and which is fed directly into the low-pressure column for further rectification. Depending upon the amount of liquid used for pre-washing the air, it may be directly discharged provided it represents only a small portion of the entire liquid. Alternatively, the washing liquid may be evaporated in a manner known in a supplementary condenser. The evaporation may, for example, take place in exchange with condensing nitrogen. The vapors obtained from the washing liquid may then be fed into the upper rectification column and the remaining liquid which has not evaporated, may be discharged. This remaining liquid contains the impurities which are continuously discharged.

Thus traces of oil and acetylene which accumulate in the washing liquid are continuously removed from the apparatus with a resulting increase of operational safety.

The invention will now be described more in detail and with reference to the accompanying drawing which diagrammatically illustrates an apparatus for its operation. The arrows applied to the drawing show the flow direction of the various media referred to in the specification.

The air upon being cooled in a counter current cooler is introduced through tube 32 into a washing liquid collecting chamber 3 provided in the lower portion of rectifier column A. This chamber 3 is disposed below a second liquid collecting chamber 4.

The air is passed through a distributor 5 into the washing liquid contained in chamber 3. Alternatively, the air may be sprinkled by sprinkler 6 with washing liquid derived from chamber 4. Thus, the air is washed and its impurities are removed. The washed air is introduced through tube 8 provided with a protecting cover 7 into the lower high-pressure section 1 of the vertical rectifier column A. There the air is subjected to a preliminary separation by sprinkling the same with liquid nitrogen. The major fraction of the oxygen-rich liquid which accumulates in chamber 4 flows into tube 10, is expanded by valve 9 and fed into the low pressure section 2 of the column A. There the air is separated into pure oxygen and pure nitrogen.

The oxygen denoted by numeral 13 is either discharged as a liquid through a valve provided tube 12 or as a gas through a valve 11 provided tube 35. The nitrogen is discharged from column A in a gaseous state through tube 14.

The washing liquid containing the impurities is removed through tube 15 from the lower chamber 3; it is either discharged into the atmosphere through the valve provided tube 16 or it is fed through a valve provided tube 17 into the condenser 18.

Here the washing liquid is evaporated. The formed vapors flow in the same direction as the residual liquid through the pipes 19, are withdrawn through pipe 20, expanded through valve 21 and introduced through tube 22 into the upper low pressure section 2 of the rectifier column A.

The remaining and unevaporated liquid 33 with its suspended impurities is discharged through a valve provided tube 23.

The evaporation takes place in exchange with nitrogen which is withdrawn under pressure in a gaseous state from condenser 24 and introduced into the additional condenser 18 through tube 25.

The liquid nitrogen is removed through a valve provided tube 26, whereupon it is expanded and combined with the major fraction of the liquid nitrogen which is withdrawn through tube 28 from the pressure column A.

The liquid nitrogen is then refed through tube 29 into the upper low-pressure section 2 of column A, where it is used for sprinkling the air.

The amount of liquid passed from chamber 4 into chamber 3 and used for a preliminary washing of the air may be controlled by valve 30. If valve 30 is closed, only the liquid which flows over the upper edge of tube 8 is discharged from chamber 4 into chamber 3.

The invention has been described with reference to a preferred embodiment and it will be understood that many variations and modifications thereof may be resorted to without departure from the scope of the invention as defined in the following claims.

What I claim is:

1. In a process for the purification of air during its rectification in a vertical rectifier column having a lower high-pressure section, a higher low-pressure section and a condenser located in said rectifier between said two sections, the steps of passing precooled air through a washing liquid located in the bottom portion of the high-pressure section of said rectification column, conducting the washed air upwardly within said pressure section while sprinkling it with liquid nitrogen, collecting an oxygen-rich liquid in a chamber located in said high-pressure section above its bottom portion, expanding the greater portion of said oxygen-rich liquid into the upper low-pressure section for its separation into oxygen and nitrogen, discharging the washing liquid from said column while conducting the residual portion of said oxygen-rich liquid into the bottom portion of said column to replace the discharged washing liquid.

2. In a process according to claim 1, the steps of partly evaporating the contaminated washing liquid in heat exchange with condensing nitrogen, which is under pressure and in liquid form withdrawn from the condenser, conducting the whole of the washing liquid vapors into the low-pressure section of said rectification column and discharging the residual portion of the washing liquid containing the essential portion of the contaminations from said column.

3. An apparatus for the purification of air during its rectification comprising a vertical rectifier column, a lower high-pressure section and an upper low-pressure section in said column, a main condenser located in said column between the said two column sections, the bottom of the column forming a first space for washing liquid in the bottom portion of said high-pressure section, a conduit for the supply of the fresh air connected to said bottom portion and means forming a second space for the accumulation of the washed oxygen-rich liquid above said first space, a tube connecting the liquid in the said two spaces and a conduit for the expansion of the oxygen-rich liquid into the upper low pressure section of said column.

4. An apparatus according to claim 3, said tube being outsidedly connecting the bottom of the second chamber and the bottom chamber, a control valve in said tube and a sprinkler for the oxygen-rich liquid connected to the tube end reaching into the bottom chamber.

5. In the apparatus according to claim 3, a discharge tube for the gaseous oxygen attached to the low-pressure section above the condenser.

6. In the apparatus according to claim 4, a circumferential inside trough in the upper portion of the high-pressure section underneath the said condenser for the accumulation of liquid nitrogen and an outside conduit connecting said trough with the upper end of the low-pressure section for the transport of the nitrogen into the same.

7. In an apparatus according to claim 3, a supplementary condenser, a conduit connecting the first space for the washing liquid to the upper portion of said supplementary condenser, tubes in said condenser for the conduct of said washing liquid therethrough and the condensation of the same and a chamber in said condenser surrounding said pipes for the evaporation of nitrogen withdrawn from the main condenser.

8. In an apparatus according to claim 3, a supplementary condenser, a conduit connecting the first space for the washing liquid to the upper portion of said supplementary condenser, tubes in said condenser for the conduct of said washing liquid therethrough and the condensation of the same, a chamber in said condenser surrounding said pipes for the evaporation of nitrogen withdrawn from the main condenser, a conduit connecting the top portion of said supplementary condenser with the low-pressure section of the main condenser, a conduit connecting the lower portion of said chamber to the upper part of the low-pressure section of the rectifier column and a valve for the control of the nitrogen supply in said conduit.

PHILIPP BORCHARDT.

REFERENCES CITED

The following references are of record in the file of this patent:

UNITED STATES PATENTS

| Number | Name | Date |
|---|---|---|
| 2,256,421 | Borchardt | Sept. 16, 1946 |
| 2,502,250 | Dennis | Mar. 28, 1950 |
| 2,502,282 | Schlitt | Mar. 28, 1950 |
| 2,521,400 | Ogorzaly | Sept. 5, 1950 |